UNITED STATES PATENT OFFICE.

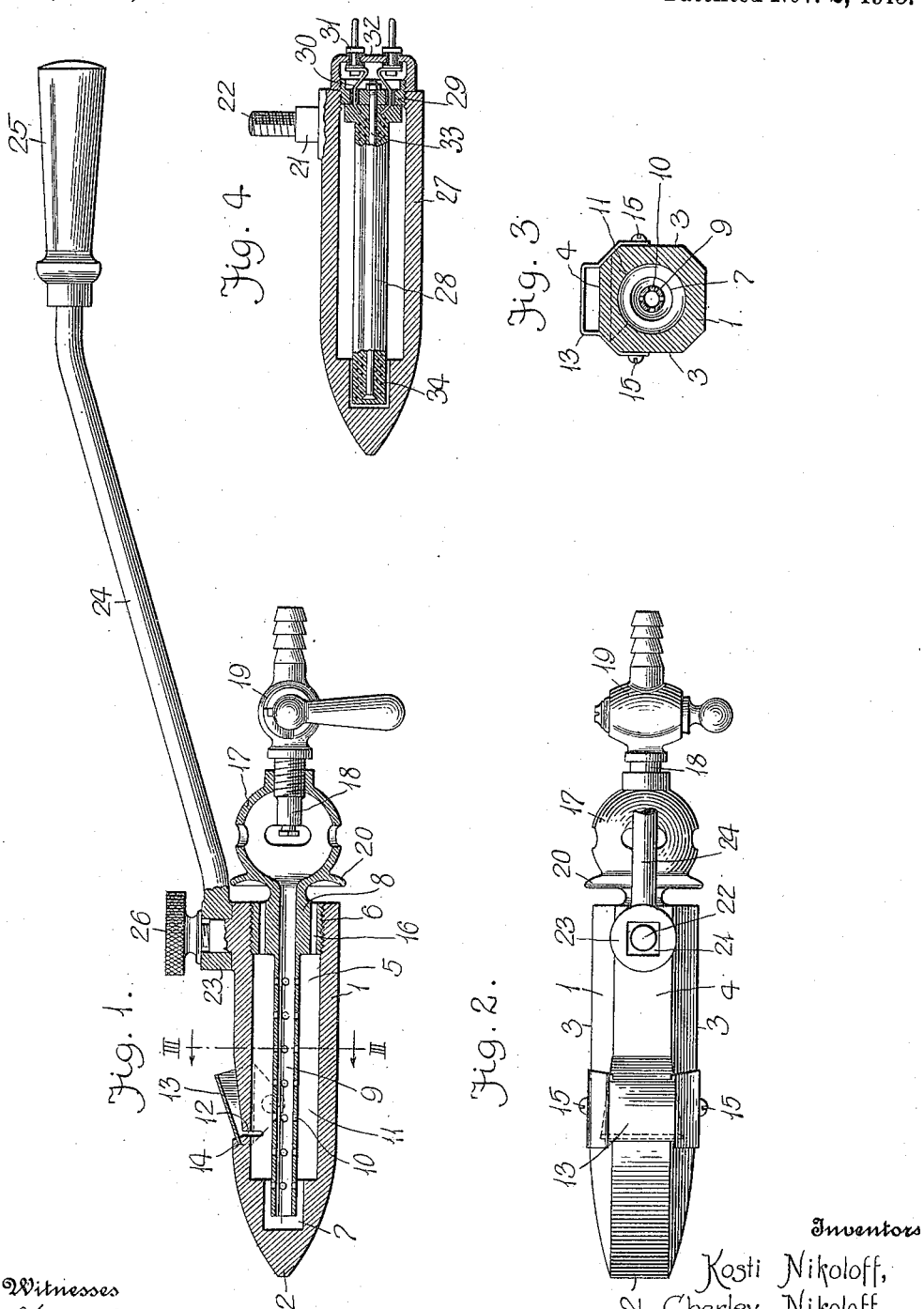

KOSTI NIKOLOFF AND CHARLEY NIKOLOFF, OF DETROIT, MICHIGAN.

SOLDERING-IRON.

1,158,540.  Specification of Letters Patent.  Patented Nov. 2, 1915.

Application filed April 19, 1915. Serial No. 22,267.

*To all whom it may concern:*

Be it known that we, KOSTI NIKOLOFF and CHARLEY NIKOLOFF, subjects of the Sultan of Turkey, residing at Detroit, in the county of Wayne and State of Michigan, have invented certain new and useful Improvements in Soldering-Irons, of which the following is a specification, reference being had therein to the accompanying drawings.

This invention relates to a soldering iron, and the primary object of our invention is to provide an iron wherein gas or electricity can be utilized for heating the iron, thus obviating the necessity of providing portable stoves and fuel therefor in order to heat an iron.

Another object of our invention is to furnish a soldering iron with an adjustable handle bar that can be placed in a line with the iron or at right angles to each other, thus permitting of the iron being used in small spaces that could not be reached with a soldering iron having a straight fixed handle bar.

We attain the above objects by a soldering iron, which in its general make up, is constructed with a view of reducing the cost of manufacture and at the same time retain the features by which safety, durability and simplicity are secured, and with such ends in view, our invention resides in the novel construction, combination and arrangement of parts to be hereinafter specifically described and then claimed.

Reference will now be had to the drawings, wherein—

Figure 1 is a longitudinal sectional view of a gas heated soldering iron, partly in elevation; Fig. 2 is a plan of a portion of the soldering iron; Fig. 3 is a cross sectional view taken on the line III—III of Fig. 1, and Fig. 4 is a longitudinal sectional view of an electrically heated soldering iron.

In the drawing, the reference numeral 1 denotes an iron body having the outer end thereof terminating in a nose or tapering soldering piece 2. The iron body is preferably octagonal in cross section thereby providing flat facets or side walls 3, and a flat top wall 4. The iron body has a longitudinal bore 5, open at the inner end of the body and the walls thereof screwthreaded, as at 6. The inner end of the bore 5 is reduced, as at 7, and terminates within the nose of the body.

Screwed into the inner end of the bore 5 is the exteriorly screwthreaded head 8 of a perforated jet pipe or burner 9, said burner having a series of apertures 10 and an open end within the reduced end of the bore 5. The perforated burner is of a diameter considerably less than that of the bore 5, thereby providing an annular chamber 11 within the bore, and communicating with said chamber is a transverse outlet opening 12, in the form of a slit, which allows products of combustion to escape from the chamber 11. To prevent a flame projecting outwardly from the opening 12, a guard or shield 13 is arranged at an inclination over the opening, said guard or shield having an edge thereof mounted in a groove 14 provided therefor in the nose of the iron body, and to further hold the guard or shield in position, the side edges thereof are connected to the flat facets 3 of the iron body 1, by screws 15 or other fastening means. This guard or shield readily deflects any flame that may be projected through the opening during the operation of the iron.

The head 8 of the burner 9 is provided with a plurality of apertures 16 for the escape of products of combustion from the chamber 11, and formed integral with the head 8 is a single hollow air mixing device 17 into which projects the nozzle 18 of an ordinary gas cock or valve 19. The air mixer has the forward end thereof provided with an integral shield 20, which prevents back fire or the flare back of a flame from igniting at the mixer.

The top of the iron body 1, at the inner end thereof, is provided with a post 21 terminating in an exteriorly screwthreaded stem or screw 22. The post 21 has flat facets and mounted upon said post is the head 23 of a non-rotatable handle bar 24 provided with a suitable handle 25. The head 23 is retained upon the post 21 by a knurled nut 26 screwed upon the screw 22, said nut preventing the handle bar from becoming accidentally displaced relative to the iron body 1 but permitting of said handle bar being set at a right angle relative to the iron body, whereby the soldering iron can be used in confined spaces and such places that could not be conveniently reached by a handle bar fixed in alinement with the soldering iron. It is preferable to dispose the handle bar at an angle relative to the longitudinal axis of the soldering iron in order to provide clearance for gas supply connections to the cock or valve 19.

In Fig. 4 of the drawing there is illustrated an iron body 27 provided with an electric heating element 28, said element including a resistance member or coil, suitable insulation, and electrical connections whereby electricity can be utilized as a heating medium for the iron body. As shown, the electric heating element comprises a plug 29 screwed into the open end of the bore of the iron body. The plug has insulated openings for lead in wires 30 connected to binding posts 31, carried by a cap 32 screwed upon the plug 29. The plug 29 supports a tie rod 33 and molded or otherwise fixed to said rod is a body of insulation containing a resistance coil 34. This type of soldering iron can be conveniently used when a suitable source of electrical energy is at hand in the absence of a supply of gas. It is also possible to use the gas or electrically heated iron body in connection with an ordinary portable stove, as commonly employed for such purposes, when gas or electricity are not convenient to the work to be performed.

What we claim is:—

A soldering iron comprising a body provided with a bore, said body having an opening in the top thereof in communication with the bore of said body, a shield disposed at an inclination to the body over the opening thereof with the forward edge of said shield mounted in said body and the sides of said shield secured to the sides of said body, a handle bar detachably connected to the inner end of said body and capable of being set at a right angle relative thereto, and means detachably connected to the inner end of said iron body for heating said body.

In testimony whereof we affix our signatures in presence of two witnesses.

KOSTI NIKOLOFF.
CHARLEY NIKOLOFF.

Witnesses:
ANNA M. DORR,
KARL H. BUTLER.

Copies of this patent may be obtained for five cents each, by addressing the "Commissioner of Patents, Washington, D. C."